United States Patent
Fattey et al.

(10) Patent No.: US 11,559,898 B2
(45) Date of Patent: Jan. 24, 2023

(54) TELEOPERATION SYSTEM, METHOD, APPARATUS, AND COMPUTER-READABLE MEDIUM

(71) Applicant: Moog Inc., East Aurora, NY (US)

(72) Inventors: Michael G. Fattey, Lancaster, NY (US); Jos Meuleman, Zwaanshoek (NL); Gonzalo Rey, Foster City, CA (US)

(73) Assignee: Moog Inc., East Aurora, NY (US)

( * ) Notice: Subject to any disclaimer, the term of this patent is extended or adjusted under 35 U.S.C. 154(b) by 190 days.

(21) Appl. No.: 16/652,862

(22) PCT Filed: Oct. 5, 2018

(86) PCT No.: PCT/US2018/054577
§ 371 (c)(1),
(2) Date: Apr. 1, 2020

(87) PCT Pub. No.: WO2019/071107
PCT Pub. Date: Apr. 11, 2019

(65) Prior Publication Data
US 2020/0306974 A1    Oct. 1, 2020

Related U.S. Application Data

(60) Provisional application No. 62/568,905, filed on Oct. 6, 2017.

(51) Int. Cl.
  *B25J 9/16*    (2006.01)
  *B25J 9/00*    (2006.01)
  (Continued)

(52) U.S. Cl.
  CPC .......... *B25J 9/1689* (2013.01); *B25J 9/0081* (2013.01); *B25J 9/161* (2013.01); *B25J 9/1664* (2013.01);
  (Continued)

(58) Field of Classification Search
  CPC ...... B25J 9/1689; B25J 9/1671; B25J 9/0081; B25J 9/1664; B25J 9/161; B25J 13/025; B25J 13/08
  (Continued)

(56) References Cited

U.S. PATENT DOCUMENTS 5,389,865 A    2/1995  Jacobus et al.
5,459,382 A    10/1995 Jacobus et al.
(Continued)

FOREIGN PATENT DOCUMENTS

CN    101377547 B    2/2011
CN    102233575 A    11/2011
(Continued)

OTHER PUBLICATIONS

Siciliano et al. (2009) "Force Control—Chapter 9 of Robotics, Modeling, Planning and Control," Robotics, Modeling, Planning and Control.

(Continued)

*Primary Examiner* — Dalena Tran
(74) *Attorney, Agent, or Firm* — Harter Secrest & Emery LLP (57) ABSTRACT

Embodiments of the present disclosure provide a system, method, apparatus and computer-readable medium for teleoperation. An exemplary system includes a robot machine having a machine body, at least one sensor, at least one robot processor, and at least one user processor operable to maintain a user simulation model of the robot machine and the environment surrounding the robot machine, the at least one user processor being remote from the robot machine. The system further includes at least one user interface comprising a haptic user interface operable to receive user commands and to transmit the user commands to the user (Continued)

simulation model, a display operable to display a virtual representation of the user simulation model.

23 Claims, 5 Drawing Sheets

(51) Int. Cl.
   *B25J 13/02* (2006.01)
   *B25J 13/08* (2006.01)
(52) U.S. Cl.
   CPC ........... *B25J 9/1671* (2013.01); *B25J 13/025* (2013.01); *B25J 13/08* (2013.01)
(58) Field of Classification Search
   USPC ................ 700/245, 247, 253, 65, 83; 703/1; 706/920
   See application file for complete search history.

(56) References Cited

U.S. PATENT DOCUMENTS

| | | | |
|---|---|---|---|
| 6,144,884 | A | 11/2000 | Niemeyer et al. |
| 6,815,687 | B1 | 11/2004 | Branch-Sullivan et al. |
| 7,027,965 | B2 | 4/2006 | Hannaford et al. |
| 7,211,980 | B1 | 5/2007 | Bruemmer et al. |
| 7,626,569 | B2 * | 12/2009 | Lanier ..................... G06F 3/012 348/42 |
| 7,885,732 | B2 | 2/2011 | Troy et al. |
| 8,171,152 | B2 | 5/2012 | White et al. |
| 8,287,522 | B2 | 10/2012 | Moses et al. |
| 8,634,969 | B2 | 1/2014 | Buelthoff et al. |
| 8,682,489 | B2 | 3/2014 | Itkowitz et al. |
| 8,804,794 | B2 | 8/2014 | Malkin et al. |
| 8,918,215 | B2 | 12/2014 | Bosscher et al. |
| 9,144,907 | B2 | 9/2015 | Summer et al. |
| 9,283,674 | B2 | 3/2016 | Hoffman et al. |
| 9,300,430 | B2 | 3/2016 | Summer et al. |
| 9,579,799 | B2 | 2/2017 | Parker |
| 9,592,604 | B2 | 3/2017 | Hoffman et al. |
| 9,776,325 | B1 | 10/2017 | Hoffmann et al. |
| 10,981,270 | B1 * | 4/2021 | Pastor Sampedro .... B25J 9/163 |
| 2006/0161647 | A1 | 7/2006 | Wojtkiewicz et al. |
| 2008/0144563 | A1 | 6/2008 | Hart |
| 2011/0054689 | A1 | 3/2011 | Nielsen et al. |
| 2012/0290130 | A1 * | 11/2012 | Kapoor .................. B25J 9/1671 700/254 |
| 2014/0094968 | A1 | 4/2014 | Taylor et al. |
| 2014/0226024 | A1 | 8/2014 | Limbaugh et al. |
| 2014/0324249 | A1 | 10/2014 | Lacaze et al. |
| 2016/0055677 | A1 | 2/2016 | Kuffner |
| 2016/0257000 | A1 | 9/2016 | Guerin et al. |
| 2017/0010671 | A1 | 12/2017 | Toiserkan |
| 2017/0348854 | A1 * | 12/2017 | Oleynik ................. A47B 77/16 |
| 2018/0060459 | A1 * | 3/2018 | English .................... G06F 30/20 |

FOREIGN PATENT DOCUMENTS

| | | | |
|---|---|---|---|
| CN | 102880063 | A | 1/2013 |
| CN | 103302668 | A | 9/2013 |
| CN | 106142083 | A | 11/2016 |
| EP | 1629949 | A2 | 1/2006 |
| KR | 101108927 | B1 | 2/2009 |
| KR | 20100106834 | A | 10/2010 |
| KR | 20100124638 | A | 11/2010 |
| KR | 101114226 | B1 | 3/2012 |
| WO | 2014140536 | A1 | 9/2014 |
| WO | WO-2015154172 | A1 * | 10/2015 ................ B25J 3/04 |
| WO | 2016096456 | A1 | 10/2016 |
| WO | WO-2016172718 | A1 * | 10/2016 |

OTHER PUBLICATIONS

PCT International Search Report dated Jan. 29, 2019 in PCT/US2018/054577, 4 pages.

Liu et al. (2013) "Control of semi-autonomous teleoperation system with time delays", Automatica 49(6) 1553-1565.

Zakaria et al. (2012) "Development of foolproof catheter guide system based on mechatronic design," Production Engineering 7(1): 81-90.

Sanders-Reed (2010) "Vision systems for manned and robotic ground vehicles," Proc. SPIE 7962: 1-12.

Nasry et al. (2013) "Time-Delay Compensation in Environment Construction Using Laser Range Finder," International Journal of Computer Theory and Engineering 5(4): 707-711.

Burdea (1999) "Invited Review: The Synergy Between Virtual Reality and Robotics," IEEE Transactions on Robotics and Automation 15(3): 400-410.

Jeon et al. (2012) "Extending Haptic Augmented Reality: Modulating Stiffness during Two-Point Squeezing," 2012 IEEE Haptics Symposium, 6 pages.

Wang et al. (2007) "Design, Strategies, and Issues Towards an Augmented Reality-Based Construction Training Platform," ITcon 12: 363-380.

Steuer (1992) "Defining Virtual Reality: Dimensions Determining Telepresence," SRCT Paper #104: 25 pages.

Van Krevelen (2007) "Augmented Reality: Technologies, Applications, and Limitations," Vrije Universiteit Amsterdam, Department of Computer Science: 25 pages.

Alex et al. (1998) "A Virtual Reality Teleoperator Interface for Assembly of Hybrid Mems Prototypes," Proceedings of DETC '98, 1998 ASME Design Engineering Technical Conference, Atlanta, GA: 7 pages.

Passenberg et al. "A survey of environment-, operator-, and task-adapted controllers for teleoperation systems," Preprint submitted to Spec. Iss. on Design & Control Meth, in Telerobotics: 25 pages.

Rodriguez et al. "Virtual Reality in Cooperative Teleoperation," IRIT—Institut de Recherche en Informatique de Toulouse: 7 pages.

Wang (2007) "Using Augmented Reality to Plan Virtual Construction Worksite," International Journal of Advanced Robotic Systems 4(4): 501-512.

Van Der Meijden et al. (2009) "The value of haptic feedback in conventional and robot-assisted minimal invasive surgery and virtual reality training: a current review," Surg Endosc 23: 1180-1190.

Nojima et al. (2002) "The SmartTool: A system for augmented reality of haptics," Proceedings of the IEEE Virtual Reality 2002 (VR'02): 6 pages.

Basanez et al. (2009) "Teleoperation," Chapter 27 in Springer Handbook of Automation, Springer: 449-468.

Kadavasal et al. (2007) "Sensor Enhanced Virtual Reality Teleoperation in Dynamic Environment," 2007 IEEE Virtual Reality Conference, Charlotte, NC: 5 pages.

Kheddar et al. (1997) "Multi-Robots Teleoperation—Analysis and Prognosis," 6th IEEE International Workshop on Robot and Human Communication, Sendai, Japan: 166-171.

Kheddar et al. (1998) "Mobile Robot Teleoperation in Virtual Reality," IEEE/SMC IMACS Multiconference on Computational Engineering in Systems Applications, vol. L: 6 pages.

Okamura (2004) "Methods for haptic feedback in teleoperated robot-assisted surgery," Ind Rob. 31(6): 499-508.

Westerberg et al. (2013) "Virtual Environment-Based Teleoperation of Forestry Machines: Designing Future Interaction Methods," Journal of Human-Robot Interaction 2(3): 84-110.

Anderson et al. (2012) "Constraint-based semi-autonomy for unmanned ground vehicles using local sensing," SPIE 8387: 8 pages.

Tzafestas et al. (2000) "VR-based Teleoperation of a Mobile Robotic Assistant: Progress Report," DEMO 2000/13: 1-23.

Lam (2009) "Haptic Interface for UAV Teleoperation," Dissertation for Delft University of Technology: 222 pages.

Vozar (2013) "A Framework for Improving the Speed and Performance of Teleoperated Mobile Manipulators," Dissertation for The University of Michigan: 121 pages.

Chen et al. (2005) "Robotic Operator Performance in Simulated Reconnaissance Missions," ARL-TR-3628: 62 pages.

Kruckel et al. (2015) "Intuitive Visual Teleoperation for UGVs Using Free-Look Augmented Reality Displays," IEEE International Conference on Robotics and Automation, Seattle, WA: 6 pages.

(56) References Cited

OTHER PUBLICATIONS

Kumar et al. (Mar. 2016) "Design and Control of Defense Robot Based On Virtual Reality," International Journal of Science and Research 5(3): 1249-1254.

Kelly et al. (2011) "Real-Time Photorealistic Virtualized Reality Interface for Remote Mobile Robot Control," The International Journal of Robotics Research 30(3): 24 pages.

Kamezaki et al. (2014) Abstract of "A Basic Framework of Virtual Reality Simulator for Advancing Disaster Response Work Using Teleoperated Work Machines," JRM 26(4): 486-495.

Quick (2011) "Long Distance Tele-Operation system for remote control of unmanned ground vehicles," newatlas.com: 3 pages.

Smith et al. (2012) "Using simulators to measure communication latency effects in robotic telesurgery," Paper No. 12237 in Interservice/Industry Training, Simulation, and Education Conference: 7 pages.

Chen et al. (2007) "Human Performance Issues and User Interface Design for Teleoperated Robots," IEEE Transactions on Systems, Man, and Cybernetics—Part C: Applications and Reviews 37(6): 1231-1245.

Kheddar et al. (2007) Summary of "Enhanced Teleoperation Through Virtual Reality Techniques," Chapter in Advances in Telerobotics: 139-159.

Walter et al. (2004) "Virtual UAV Ground Control Station," AIAA 3rd "Unmanned Unlimited" Technical Conference, Workshop and Exhibit, Chicago, IL: 10 pages.

Witus et al. (2011) Abstract of "Methods for UGV teleoperation with high latency communications," Proceedings of SPIE—The International Society for Optical Engineering, Orlando, FL: DOI: 10.1117/12.886058.

Sivaraman et al. (2009) "Sensor Augmented Virtual Reality Based Teleoperation Using Mixed Autonomy," Journal of Computing and Information Science in Engineering 9: 014502-1-014502-5.

Kheddar (1996) "Multi-robot teleoperation using direct human hand actions," Advanced Robotics 11(8): abstract only.

\* cited by examiner

TELEOPERATION SYSTEM, METHOD, APPARATUS, AND COMPUTER-READABLE MEDIUM

BACKGROUND OF THE INVENTION

Field of the Invention

Exemplary embodiments of the present disclosure relate to a system, method, apparatus, and computer-readable medium for teleoperation. The present disclosure relates more specifically to teleoperation of a remote device.

Description of Related Art

Teleoperation generally includes the operation and use of a system or machine from a distance. Teleoperation is commonly associated with the remote control of robotics and mobile robots. However, teleoperation can be applied to a range of circumstances in which a device or machine is operated by a person from a distance.

BRIEF SUMMARY OF THE INVENTION

In view of the foregoing, it is an object of the present disclosure to provide a system, method, apparatus, and computer-readable medium for teleoperation.

A first exemplary embodiment of the present disclosure provides a system for teleoperation. The system includes a robot machine having a machine body, at least one sensor operable to sense data regarding the machine body and an environment surrounding the robot machine, at least one robot processor operable to maintain a robot simulation model of the robot machine and the environment surrounding the robot machine, and the robot processor operable to communicate with the at least one sensor and to maneuver the machine body in the environment surrounding the robot machine as a function of the sensed data from the at least one sensor. The system further includes at least one user processor operable to maintain a user simulation model of the robot machine and the environment surrounding the robot machine, the at least one user processor being remote from the robot machine, and the at least one user processor operable to communicate with the robot machine. The system still further includes at least one user interface including a user control operable to receive user commands and to transmit the user commands to the user simulation model, a display operable to display a virtual representation of the user simulation model, wherein the user simulation model receives user commands from the user interface and outputs virtual representation updates to the user interface based on the received user commands, and wherein the user simulation model receives sensed data from the at least one sensor and outputs robot virtual representation updates to the user interface based on the received sensed data. The system further includes wherein the robot simulation model receives sensed data from the at least one sensor and outputs robot commands to the machine body based on the received sensed data, wherein the robot simulation model receives user commands from the user interface and outputs robot user commands to the machine body based on the received user commands, wherein the user simulation model receives robot simulation updates from the robot simulation model and transmits user simulation updates to the robot simulation model, and wherein the robot simulation model receives user simulation updates from the user simulation model and transmits robot simulation updates to the user simulation model.

A second exemplary embodiment of the present disclosure provides an apparatus for teleoperation. The apparatus includes at least one processor and a memory storing computer program instructions executable by the at least one processor, wherein the memory with the computer instructions and the processor are configured to cause the apparatus to at least maintain, by the memory, a simulation model, and sense, by at least one sensor, data corresponding to a body of the apparatus and an environment surrounding the apparatus. The apparatus is further configured to transmit, by the at least one processor, the sensed data, and receive, by the at least one processor, a new simulation model, the new simulation model comprising a description of the body of the apparatus and the environment surrounding the apparatus. The apparatus is still further configured to determine, by the at least one processor, an updated simulation model, the updated simulation model comprising a combination of the new simulation model and the sensed data, and moving the apparatus in response to the determined updated simulation model.

A third exemplary embodiment of the present disclosure provides an apparatus for teleoperation. The apparatus includes at least one processor and a memory storing computer program instructions executable by the at least one processor, wherein the memory with the computer instructions and the processor are configured to cause the apparatus to at least maintain, by the memory, a simulation model, and transmit, by the at least one processor, the simulation model to a user interface and a robot machine. The apparatus is further configured to receive, by the at least one processor, sensed data from the robot machine and user inputs from the user interface, and determine, by the at least one processor, an updated simulation model comprising a combination of the received sensed data, the received user inputs, and the simulation model. The apparatus is still further configured to transmit, by the at least one processor, the updated simulation model to the robot machine and the user interface.

A fourth exemplary embodiment of the present disclosure provides an apparatus for teleoperation. The apparatus includes a user interface, at least one processor and a memory storing computer program instructions executable by the at least one processor, wherein the memory with the computer instructions and the processor are configured to cause the apparatus to at least maintain, by the memory, a user simulation model, and display, by the user interface, the user simulation model as a virtual representation of a robot machine and an environment surrounding the robot machine, the virtual representation based on the simulation model. The apparatus is further configured to receive, by the user interface, user inputs to the virtual representation, and change, by the at least one processor, the displayed virtual representation based on the received user inputs. The apparatus is further configured to transmit, by the at least one processor, the user inputs, to receive, by the at least one processor, an updated user simulation model, and to display, by the user interface, the updated user simulation model.

A fifth exemplary embodiment of the present disclosure provides a non-transitory computer-readable medium tangibly storing computer program instructions which when executed on a processor of an apparatus causes the apparatus to at least maintain a simulation model, and sense data corresponding to a body of the apparatus and an environment surrounding the apparatus. The apparatus is further cause to transmit the sensed data, and receive a new simulation model, the new simulation model comprising a description of the body of the apparatus and the environment surrounding the apparatus. The apparatus is still further caused to determine an updated simulation model, the updated simulation model comprising a combination of the new simulation model and the sensed data, and moving the apparatus in response to the determined updated simulation model.

A sixth exemplary embodiment of the present disclosure provides a non-transitory computer-readable medium tangibly storing computer program instructions which when executed on a processor of an apparatus causes the apparatus to at least maintain a simulation model, and transmit the simulation model to a user interface and a robot machine. The apparatus is further caused to receive sensed data from the robot machine and user inputs from the user interface, and determine an updated simulation model comprising a combination of the received sensed data, the received user inputs, and the simulation model. The apparatus is still further caused to transmit the updated simulation model to the robot machine and the user interface.

A seventh exemplary embodiment of the present disclosure provides a non-transitory computer-readable medium tangibly storing computer program instructions which when executed on a processor of an apparatus causes the apparatus to at least maintain a user simulation model, and display the user simulation model as a virtual representation of a robot machine and an environment surrounding the robot machine, the virtual representation based on the simulation model. The apparatus is further caused to receive user inputs to the virtual representation, and change the displayed virtual representation based on the received user inputs. The apparatus is further caused to transmit the user inputs, to receive an updated user simulation model, and to display the updated user simulation model.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

DETAILED DESCRIPTION OF THE INVENTION

Embodiments of the present disclosure present a user interface operable to provide a user with a visual represen-tation of a remote device, and a remote device operable to sense its surroundings and communicate with the user interface and a server. Embodiments further include server that maintains a simulation model operable to simulate the remote device, receive sensor data from the remote device, receive user inputs from the user interface, and transmit the simulation model to the user interface. Embodiments of the present disclosure allow a user to remotely control the movement of a remote device in a user interface environment that has nearly zero latency between user inputs and the user's perception that the user inputs have been executed. Embodiments of the present disclosure provide a user interface which includes a virtual representation or simulation model of a remote device operable to control a virtual representation of the remote device and operable to communicate the user inputs to the remote device to be performed by the remote device. Embodiments of the present disclosure provide a remote device operable to move in response to commands from a robot simulation model and in response to sensor data, which overrides commands from the robot simulation in response to a safety threshold.

Embodiments of the present disclosure provide an apparatus, system and method for dynamic teleoperation. Embodiments of the present disclosure provide the ability to correctly compensate for communications delays, allowing a user to drive a representation of a robot machine in real-time.

Aspects of the invention allow a remote user to interact with a virtual representation and control a robot machine in the real world. Embodiments of the virtual representation contain both a visual displayed scene of the robot machine and the environment surrounding the robot machine. Embodiments of the virtual representation also can include data fed back to the user interface from the robot machine. Embodiments of the user interface include any combination of interfaces that correctly mimic the robot machine, including motion bases, haptic feedback, and visual representations. The virtual representation is a visual depiction of a simulation model or mathematical model of the robot machine and the environment surrounding the robot machine which includes the robot machine, robot machine sensors, and physical objects surrounding the robot machine.

Figure 1:
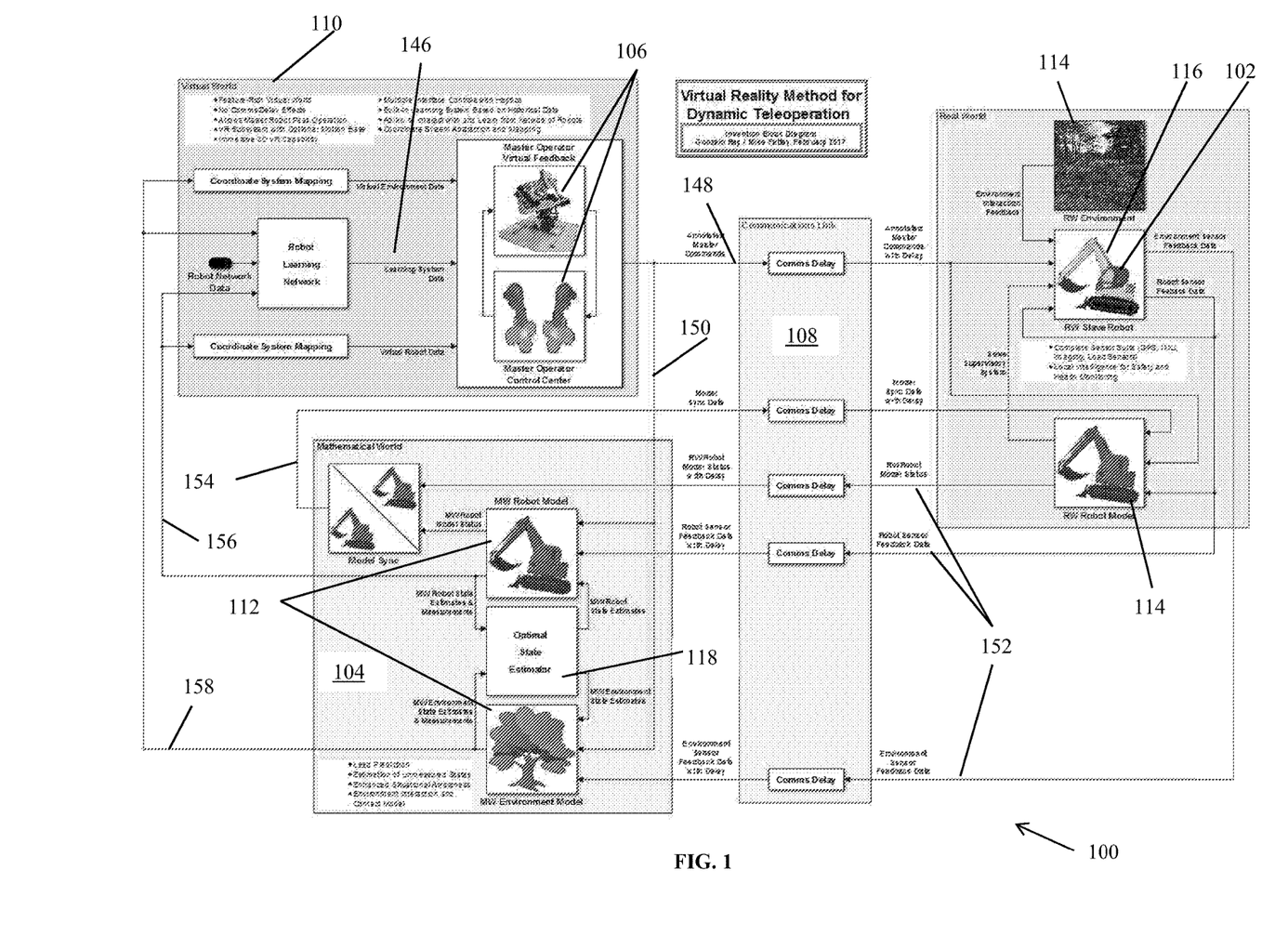
FIG. 1 is a signaling diagram of an exemplary system suitable for use in practicing exemplary embodiments of this disclosure.

Referring to FIG. 1, shown is a signaling diagram of an exemplary system suitable for use in practicing exemplary embodiments of this disclosure. Illustrated in FIG. 1 is teleoperation system 100 including robot machine 102, server 104, user interface 106, and communication link 108. Teleoperation system 100 includes three reference frames—a virtual representation 110, the simulation model 112, and the robot machine model 114. Each reference frame includes a standard, six degree-of-freedom (6DOF) coordinate system (three angular positions, velocities, and accelerations and three linear positions, velocities, and accelerations) in which kinematics and/or dynamics of an N-DOF, multi-body robot machine are described. In addition, each reference frame includes an N-DOF contact load model to describe environment interaction via a single contact point or multiple contact points. Note that these coordinate systems may be abstracted to arbitrary coordinate systems in order to map between the robot machine model 114 and the virtual representation 110, which do not need to be the same for user workload reduction reasons.

The robot machine model 114 reference frame describes the physical robot machine 102 as well as the environment surrounding the robot machine and any physical objects surrounding the robot machine 102. The robot machine is operable to perform user-controlled functions and contains a plurality of sensors 116 operable to sense the orientation and location of the robot machine and the physical environment surrounding the robot machine 102. Exemplary sensors 116 include those found in self-driving cars and the typical construction site geosystems.

The simulation model 112 reference frame describes a mathematical model of the robot machine 102 and its surrounding environment. These mathematical models maybe be based on both physics and other phenomenological effects. An optimal state estimator 118 accompanies the simulation models 112 to provide real-time system state estimation and to mitigate drift between the simulation model 112 and the robot machine model 114. An exemplary optimal state estimator 118 includes an extended Kalman filter (EKF).

The virtual representation 110 reference frame is driven by the simulation model 112 in the simulation model 112 reference frame. The virtual representation 110 provides a display of a "virtual" robot machine and its "virtual" surrounding environment. A user interacts with the virtual representation 110 with user interface 106 through user inputs to the user interface 106. Embodiments of user interface 106 includes a display 120, user controls 122 and haptic feedback device 124. Embodiments of user interface 106 through user inputs are operable to maneuver the virtual robot machine in virtual representation 110 in real-time and to transmit those maneuvers to the robot machine 102 and the server 104. Embodiments of user inputs include the user physically or verbally manipulating or instructing user interface 106 in a fashion to control forces, torques, motions (linear and rotational), and operational mode settings. The user inputs at the user interface 106 are transmitted to both server 104 and robot machine 102. The user inputs in combination with the simulation model 112 and the robot machine model 114 determine movement of the robot machine 102. The transmitted user inputs will travel to robot machine 102 through communication link 108. The time it takes the user inputs to travel to robot machine 102 through communication link 108 will be different (e.g., greater than) the time that a user will perceive the maneuvers on the virtual robot machine in the virtual representation 110 and the time to server 104.

The virtual representation 110 can include an optional motion base and 3D virtual reality similar to that found in modern gaming systems. The displayed virtual representation 110 includes of virtual objects of the robot machine 102 and the surrounding environment with full physical feature descriptions, such as trees, rocks, roads, people, and landscapes. As with modern mixed reality systems, the virtual representation 110 combines live images with simulated 3D objects in a seamless manner. Embodiments of virtual representation 110 can be displayed in one or more television displays or in an immersive, wrap-around screens would be a set of virtual reality googles with head and eye tracking.

The user interface 106 includes at least one processor, at least one memory operable to store computer program instructions. User interface 106 can also include user controls 122, a display 120, and a haptic feedback device 124. The user controls 122 and the haptic feedback device 124 can be any combination of joysticks, pedals, or application-specific interfaces (including finger and hand interfaces as in surgical robots). Embodiments of user interface 106 are operable to allow a user to manipulate the virtual representation 110 of the robot machine 102 and also is operable to provide haptic feedback to the user through haptic feedback device 124 based on movement of the virtual representation 110 of robot machine 102. User inputs from user interface 106 are transmitted as user command data 140 to server 104 and through communications link 108 to robot machine 102.

Embodiments of robot machine 102 are operable to move and interact with its environment. Robot machine 102 can include at least one robot motor 126, at least one robot processor 128, at least one robot memory 130 operable for storing computer program instructions, a plurality of sensors 116, and at least one robot device 132. The plurality of sensors 116 generate sensor feedback data 142 regarding the environment surrounding robot machine 102, the location of robot machine 102 relative to the surrounding environment and the state, status, and location of the at least one robot device 132. The sensor feedback data 142 may be of the robot machine 102 itself or of the surrounding environment and may come from any combination of measurement devices, such as Global Positioning System (GPS) antennas, inertial measurement units (IMUs), imaging sensors, and load sensors. Embodiments of the at least one robot device 132 can include any combination of moveable arms, claws, digging devices, holding devices, gripping devices, tools and the like. Robot machine 102 can also include propulsion elements 134, which includes any combination of wheels, treads, axles and the like that are operated by the at least one robot motor 126 and are operable to move the robot machine 102. The robot machine 102 further includes at least one robot transmitter 136 and at least one robot receiver 138 operable to transmit and receive communications to and from the user interface 106 and the server 104.

The at least one robot memory 130 is operable to store computer program instructions including the robot machine model 114 and any received data from the plurality of sensors 116, the user interface 106, and the server 104. The at least one robot processor 128 when executing the data stored on the at least one robot memory 130 is operable to cause the at least one robot motor 126, the propulsion element 134 and the at least one robot device 132 to move and perform as directed.

The sensor feedback data from the plurality of sensors 116 is transmitted from robot machine 102 to the server 104 via communication link 108. The data transfer through communication link 108 results in a time delay between when the data is transmitted by robot machine 102 and when it is received by server 104. After passing through communications link 108, the sensor feedback data interacts with the simulation model 112. The simulation model 112 and the sensor feedback data 142 are processed by the optimal state estimator (OSE) 118, which is operable to recursively estimate the "state information" of the slave robot and its surrounding environment given the noisy, time-delayed data through communication link 108. Embodiments of the "state information" of the robot machine 102 includes any set of variables that provide a complete representation of robot machine 102 at an instant in time. Embodiments of "state information" includes both time-varying quantities (positions, velocities, accelerations, loads, time delays) and constant quantities (model parameters, geometric parameters, inertial parameters). The OSE 118 is operable to be used to avoid quasi-steady-state drift between the simulation machine model 114 and the simulation model 112.

User command data 140, sensor feedback data 142, and state estimation data 144 drive the simulation model 112 including the simulation model 112 robot and the environment surrounding the robot in the simulation model 112 reference frame. The OSE 118 estimates all positions, velocities, and accelerations for the given models, as well as the communications time delays from communications link 108. It should be noted that any other pertinent quantities of robot machine 102 may be estimated during this process as well, such as higher-order time derivatives, constant parameters, model parameters, geometric parameters, inertial parameters, forces, positions, velocities, accelerations, loads, time delays, and torques acting on or from robot machine 102. In addition, the OSE 118 removes any extraneous data or noise present in the sensor feedback data 142 and provides state information about the robot machine 102 that may not be directly measured by the plurality of sensors 116. This results in several "virtual sensors" or extra data not necessarily present in the sensor feedback data 142 for robot machine 102, which can be used to provide enhanced situational awareness to the user through virtual representation 110. The OSE 118 is operable to update the virtual representation 110 in real-time depending on information such as the desired robot machine 102 tasks, known environment, or sensor noise levels and dynamics.

As the simulation model 112 describing both the robot machine 102 and its surrounding environment are recursively updated via sensor feedback data 142 and the OSE 118, simulation model 112 information is transmitted to the user interface 106. The simulation model 112 may undergo a coordinate system mapping in order to reduce the processing required by the user interface 106 to create the virtual representation 110 based on the simulation model 112. This results in the virtual representation 110 including a virtual robot machine data and virtual environment data with which the user can interact with through user interface 106.

In addition, a set of learning system data 146 may be transmitted to the user interface 106 to supplement the simulation model 112. The learning system data 146 includes a set of historical and task-dependent data related to the current tasks robot machine 102 in the current surrounding environment. The information from the simulation model 112 may be compared to this historical data set and pertinent behavioral or status data may be communicated to the user to assist and coach in the operation of robot machine 102. For example, the learning system data 146 can assist the user in understanding the difficulties associated with operating a robot machine 102 in the presence of a time delay between when a user inputs their commands into a user interface 106 and when they are actually carried out by robot machine 102. Indicators such as haptic feedback 124 or visual cues from display 120 may be used to communicate this information to the user at user interface 106.

In an alternative embodiment, robot machine 102 may include one or a plurality of robots that can coordinate and share their data from their sensors in a network to supplement the information in the simulation model 112 reference frame. All of the sensor data from the plurality of robots can be combined with the learning system data 146 to create a network that can benefit multiple users simultaneously that are operating multiple robot machines in a similar or the same physical environment.

The learning system data 146 and the simulation model 112, which include a mathematical model of the robot machine 102 and its surrounding environment are used as the basis for the virtual representation 110 that the user receives and interacts with at the user interface 106. The virtual representation 110 that is displayed by display 120 and felt by the user through haptic feedback 124 allow the user to feel as though they are present on the physical robot machine 102. Communications delay effects from communications link 108 are mitigated in teleoperation system 100 as the OSE 118 estimates and compensates for the time delays. The time delays between transmitted data between the robot machine 102, server 104 and user interface 106 can be estimated by OSE 118. Also, the higher-order motion derivatives of robot machine 102 can be estimated as well by OSE 118. This provides a "lead prediction" capability to the user, giving the user a sense for how the robot machine 102 is moving as time evolves. The ability to predict where the robot machine 102 will be at the next time step is critical to compensating for communications delays. Note that this information may also be used in a feed-forward sense, allowing the user to compensate for known disturbances in the system and environment.

As the user interacts with the virtual representation 110 with minimal delay or no delay between when the user makes a user input and when the user perceives the execution of the user input in the virtual representation 110, the user is able to user command data 140 to the robot machine 102 such that the robot machine 102 can successfully perform tasks and interact with its environment.

Additionally, the robot machine 102 contains local intelligence in the form of its own robot machine model 114, which is a mathematical representation of the robot machine 102 and the environment surrounding the robot machine 102. This on-board mathematical model includes sensor feedback data 142 and a version of the simulation model 112, and performs the same tasks as the simulation model 112. This robot machine model 114 serves as a supervisory system and does not suffer the delays of the communications link 108 since no data needs to be transmitted over the communications link 108. The simulation model 112 and the robot machine model 114 are constantly synchronized over the communications link 108. This synchronization monitors the time evolutions of the simulation model 112 and the robot machine model 114 and can contain additional information beyond what the user controls can provide, such as feed-forward data, time delay data, or virtual sensor data.

The robot machine 102 robot machine model 114 also assists in avoiding unintended collisions and other unintended effects with the surrounding environment. This relies on annotated user commands that contain information about the virtual representation 110 and the intended effect of the user commands in when executed by the robot machine 102. For example, the virtual representation 110 indicates contact with the environment that enables the robot machine 102 to continue to move past a sensed contact, impending or actual, depending on the sensors used to control safety. Embodiments include wherein computationally complex cognitive functions, such as 3D world mapping and scene annotations, are performed by one or both of the server 104 or robot machine 102. Embodiments also include that the portion of the simulation model 112 and/or the robot machine model 114 encompassing the environment surrounding the robot machine 102 include information from other sources such as a robot network or past learning data.

Embodiments of the present disclosure provide a system or apparatus wherein the user does not feel the effects of the communications channel latency and operates in a feature rich virtual user interface. The richness of the virtual representation is possible because it does not rely on real-time sensor back from a remote robot machine that would be limited in content by communications link bandwidth. Rather, the user interacts with the virtual user interface and operates the virtual representation of the robot machine in real-time. Additionally, the bandwidth of the sensors on the robot machine themselves is not a factor in the visual, auditory, inertial, and load feedback the user receives at the user interface. These are locally synthesized with virtually zero lag. The end result is that the user can operate the representation of the robot machine at the peak of his/her dynamic capabilities unencumbered by the communications link lag.

In practice, a user interacts with the virtual representation 110 through user interface 106 and operates a virtual representation of simulation model 112, which is a virtual representation of robot machine 102 and its surrounding environment. When the user inputs a user command (e.g., movement of the virtual representation of robot machine 102), the virtual representation 110 in real-time moves the virtual representation of robot machine 102 as instructed by the user. Simultaneously, the user command is transmitted over communication link 108 via communication line 148 to robot machine 102. The user command is also sent to server 104 via communication line 150. The robot machine 102 combines the robot simulation model 114, sensor feedback data 142 from the plurality of sensors 116 having information regarding the status of the robot machine 102 and the surrounding environment to determine an updated robot machine model 114. The robot machine 102 with the at least one robot processor 128 and at least one robot memory 130 will determine whether there is a difference between the status of the robot machine 102 and the determined updated robot machine model 114. If there is a difference, the at least one robot processor 128 will cause the robot machine 102 to move such that the robot machine 102 is configured the same as the updated robot machine model 114 and no difference exists.

The robot machine 102 will also transmit the sensor feedback data 142 from the plurality of sensors 116 to server 104 through communications link 108 via communication line 152. The robot machine 102 also transmits a copy of the robot machine model 114 (including updates to the robot machine model 114) to server 104 via communication line 152 through communications link 108.

Upon receipt of the robot machine model 114 and sensor feedback data 142, server 104 will, in combination with the OSE 118, combine the simulation model 112, the sensor feedback data 142, and user commands to determine an updated simulation model 112. The updated simulation model 112 will be transmitted to the robot machine 102 through communications link 108 via communication line 154. The simulation model 112 is also sent to the user interface 106 via communication line 156. The received sensor feedback data 142 is sent from server 104 to user interface 106 via communication line 158.

Figure 2:
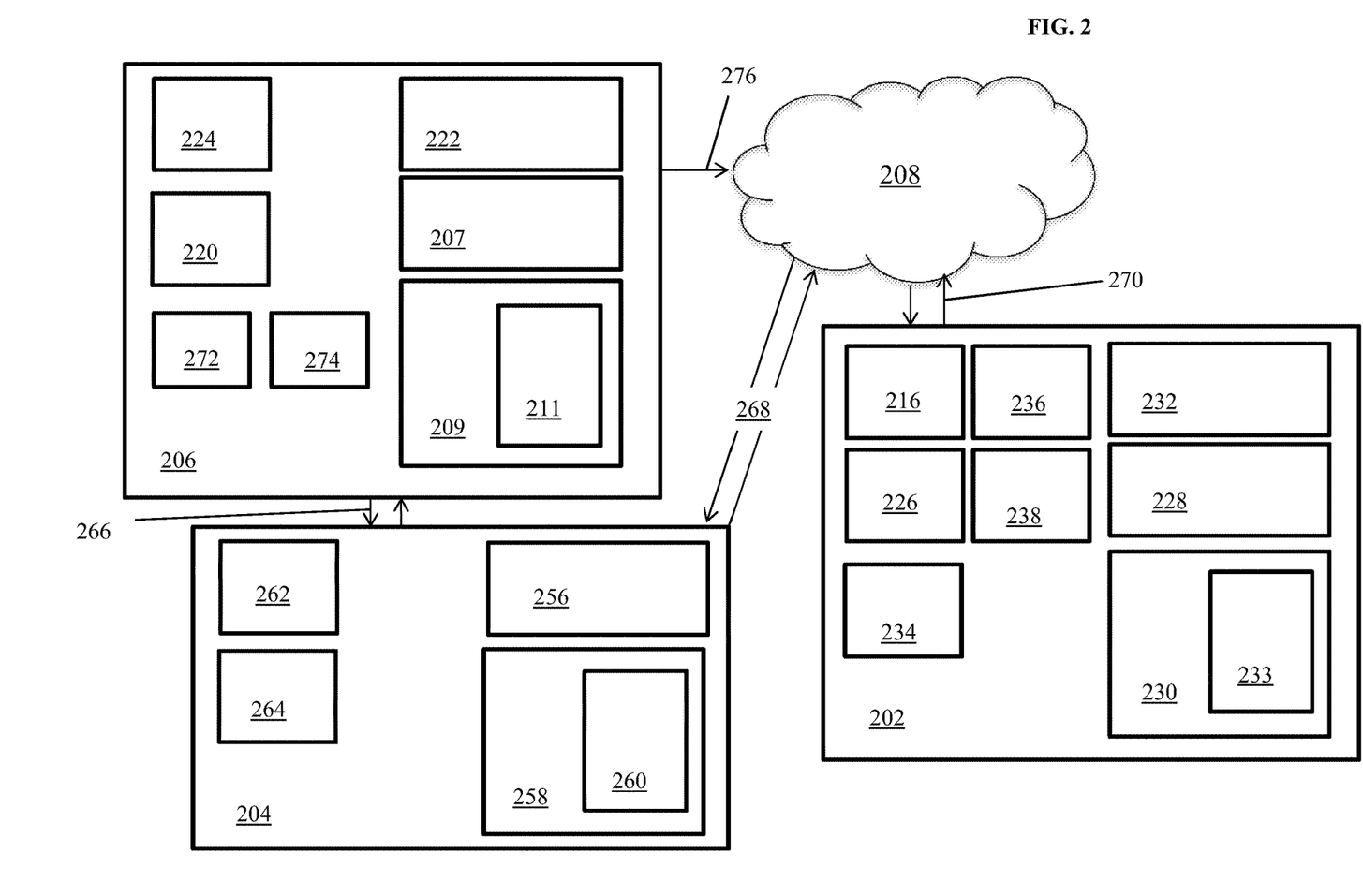
FIG. 2 is a simplified block diagram of the devices suitable for use in practicing exemplary embodiments of this disclosure.

Reference is now made to FIG. 2, which illustrates a simplified block diagram of the devices suitable for use in practicing exemplary embodiments of this disclosure. In FIG. 2, server 204 is adapted for communication over communications link 208 with robot machine 202. Similarly, server 204 is adapted for communication with user interface 206 directly. Server 204 can communicate with user interface 206 and robot machine 202 through wired connections, wireless connections, or a combination of both. Embodiments of server 204 include a single server or a plurality of servers.

Server 204 includes its own processing means such as at least one processor 256, storing means such as at least one computer-readable memory 258 storing at least one computer program 260. Server 204 also includes communicating means such as a transmitter 262 and a receiver 264 for bidirectional wired or wireless communication with other devices shown in FIG. 2. Server 204 may communicate directly with user interface 206 through communication line 266. Server 204 is operable to communicate with robot machine 202 through communication link 208 via wired and/or wireless connections through communication lines 268 and 270.

User interface 206 includes its own processing means such as at least one processor 207, storing means such as least one computer-readable memory 209 storing at least one computer program 211. User interface 206 also includes communicating means such as transmitter 272 and a receiver 274 for bidirectional wireless or wired communication with server 204 through communication line 266. User interface 206 is also operable for communication to robot machine 202 through communication line 276, communication line 270, and communications link 208. User interface 206 includes a display 220 operable for displaying a virtual representation and user controls 222 for interacting with and manipulating the virtual representation. User interface 206 is operable to provide haptic feedback to a user through haptic feedback device 224.

Robot machine 202 includes its own processing means such as at least one processor 228, storing meanings such as at least one computer-readable memory 230 storing at least one computer program 233, and communicating means such as transmitter 236 and receiver 238 for bidirectional wireless communications with server 204. It should be appreciated that embodiments include both wireless and wired communication. Robot machine 202 is also operable to receive communications from user interface 206 through communication line 276, 270 and communications link 208. Robot machine 202 includes at least one robot device 232. Embodiments of the at least one robot device 232 includes any combination of moveable arms, claws, digging devices, holding devices, gripping devices, tools and the like. Robot machine 202 includes a plurality of sensors 216 operable to sense the location and status/state of the physical robot machine 202 body and the environment surrounding the robot machine 202. Robot machine 202 includes a motor 226 and propulsion elements 234 such as any combination of wheels, treads, tracks, jet engines, and propellers. Motor 226 is operable to provide power to and move propulsion elements 234 and robot device 232. In some embodiments, motor 226 may include at least two motors.

Computer program instructions 211, 260, 233 are assumed to include program instruction that, when executed by the associated processor 207, 256, 228 enable each device to operate in accordance with embodiments of the present disclosure, as detailed above. In these regards, embodiments of this disclosure may be implemented at least in part by computer software stored on computer-readable memories 258, 209, 230 which is executable by processors 207, 256, 228, or by hardware, or by a combination of tangibly stored software and hardware (and tangibly stored firmware). Electronic devices implementing these aspects of the disclosure need not be the entire devices as depicted in FIG. 1 and FIG. 2, but embodiments may be implemented by one or more components of same such as the above described tangibly stored software, hardware, firmware and processor, or a system on a chip, an application specific integrated circuit ASIC or a digital signal processor.

Various embodiments of the computer readable memory 209, 258, 230 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processors 207, 256, 228 include but are not limited to general purpose computers, special purpose computers, microprocessors, digital signal processors (DSPs) and multi-core processors.

Figure 3:
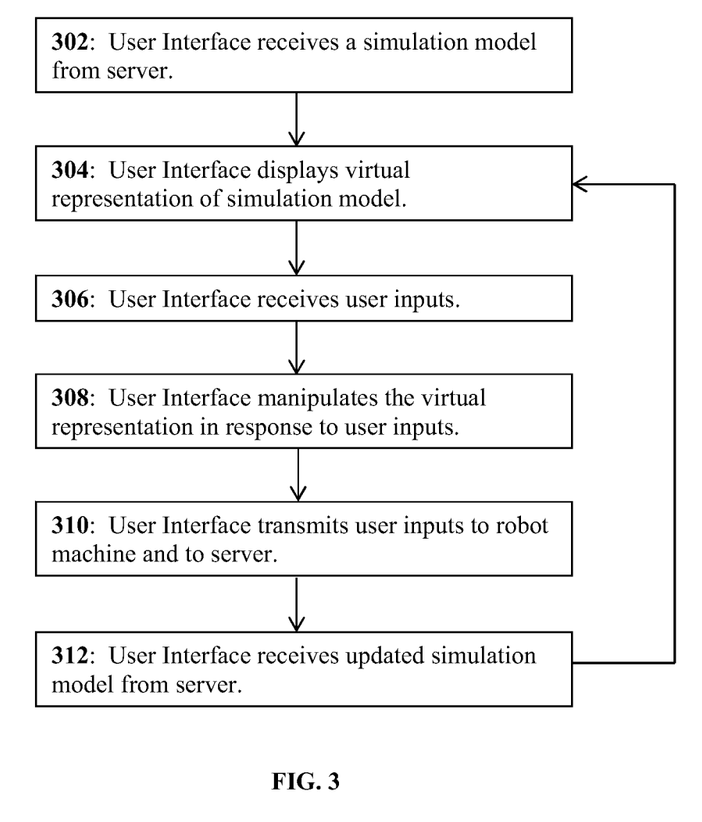
FIG. 3 is a logic flow diagram in accordance with a method, apparatus, system, and computer-readable medium for performing exemplary embodiments of this disclosure.

Reference is now made to FIG. 3, which presents a logic flow diagram in accordance with an embodiment of a user interface as described herein. An exemplary user interface begins at block 302 by receiving a simulation model from a server. Next, at block 304 the user interface displays a virtual representation of the simulation model. At block 306, the user interface receives user inputs. The user inputs can be received through user controls for a user's hands or through oral commands. At block 308, the user interface manipulates the virtual representation in response to the user inputs. Embodiments provide that the user interface is operable to provide haptic feedback to the user in response to the user inputs. For example, the virtual representation may display a virtual robot machine and a rock in the environment surrounding the robot machine. The manipulation of the virtual representation may cause the robot machine to contact the rock displayed by the user interface. In this instance, the user interface is operable to provide haptic feedback to the user in response to the robot machine contacting the rock. Embodiments of haptic feedback include the user interface applying forces, vibrations, or motions on the user through the user controls or in a user seat.

Next, at block 308 the user interface manipulates the virtual representation in response to the user inputs. Embodiments of manipulating includes moving the virtual robot machine throughout the virtual environment and/or moving portions of the virtual robot machine (e.g., a robot tool, shovel, hoe, etc.). At block 310, the user interface transmits the user inputs to a robot machine and to a server. At block 312, the user interface receives an update simulation model from the server. The process is then repeated at block 304 except for the fact that the user interface now displays the updated simulation model rather than the simulation model. It should be appreciated that embodiments of the present disclosure provide that user interface receive an updated simulation model at any point during the process set forth in FIG. 3. In this regard, block 312 can occur between blocks 304 and 206, between blocks 306 and 308, and between blocks 308 and 310.

Figure 4:
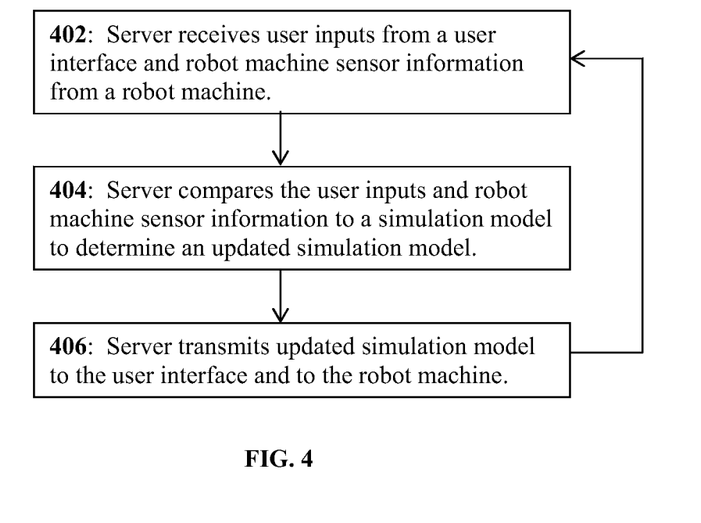
FIG. 4 is another logic flow diagram in accordance with a method, apparatus, system, and computer-readable medium for performing exemplary embodiments of this disclosure.

Referring now to FIG. 4, shown is a logic flow diagram in accordance with an exemplary server. Beginning at block 402 the server receives user inputs from a user interface and receives robot machine sensor information from a robot machine. It should be appreciated that embodiments provide that the server either receive the user inputs and the sensor information simultaneously or at different times. Next at block 404, the server compares the user inputs and the robot machine sensor information to a simulation model to determine an updated simulation model. It should be understood that embodiments of server are operable to maintain a simulation model that can be amended, changed, and/or updated by the server. At block 406, the server transmits the updated simulation model to the user interface and to the robot machine. Following block 406, the process can be repeated by beginning again at block 402.

Figure 5:
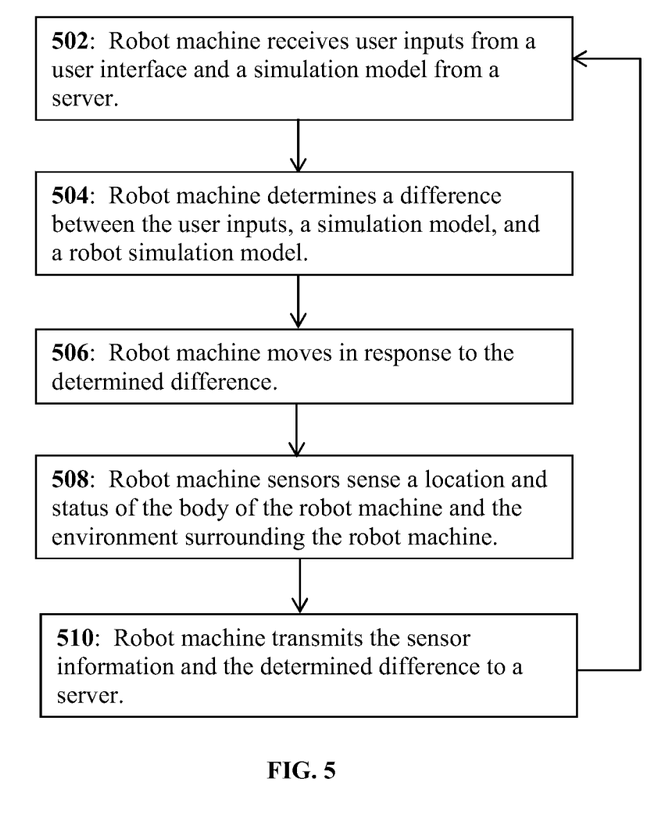
FIG. 5 is yet another logic flow diagram in accordance with a method, apparatus, system, and computer-readable medium for performing exemplary embodiments of this disclosure.

Referring to FIG. 5, shown is an exemplary logic flow diagram in accordance with an exemplary robot machine. Beginning at block 502, the robot machine receives user inputs from a user interface and a simulation model from a server. It should be appreciated that embodiments provide that the robot machine can either receive the user inputs and the simulation model simultaneously or at different times. It should also be appreciated that embodiments of robot machine are operable to maintain a robot simulation model, which is a mathematical representation of the body of the robot machine and the surrounding environment. Next at block 504, the robot machine determines a difference between the user inputs, a simulation model and the robot simulation model. At block 506, the robot machine moves in response to the determined difference. At block 508, the robot machine sensors sense a location and status of the body of the robot machine and the environment surrounding the robot machine. If should be appreciated that embodiments include block 508 occurring at any point in the process depicted in FIG. 5. Next at block 510, the robot machine transmits the sensor information and the determined difference to a server. The process can then be repeated by returning to block 502.

It should be appreciated that embodiments of the present disclosure provide that the processes described in FIGS. 3, 4, and 5 can occur simultaneous but not necessarily at the same rate. For example, the processes set forth in FIG. 3 can occur 2 or more times faster than the processes set forth in FIG. 5.

This disclosure has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A system for teleoperation, the system comprising:
 (a) a robot machine having
   a machine body,
   at least one sensor operable to sense data regarding the machine body and an environment surrounding the robot machine,
   at least one robot processor operable to maintain a robot simulation model of the robot machine and the environment surrounding the robot machine, and
   the robot processor operable to communicate with the at least one sensor and to maneuver the machine body in the environment surrounding the robot machine as a function of the sensed data from the at least one sensor;
 (b) at least one user processor operable to maintain a user simulation model of the robot machine and the environment surrounding the robot machine,
   the at least one user processor being remote from the robot machine, and
   the at least one user processor operable to communicate with the robot machine;
 (c) at least one user interface comprising
   a user control operable to receive user commands and to transmit the user commands to the user simulation model,
   a display operable to display a virtual representation of the user simulation model,
  wherein the user simulation model receives user commands from the user interface and outputs virtual representation updates to the user interface based on the received user commands;
  wherein the user simulation model receives sensed data from the at least one sensor and outputs robot virtual representation updates to the user interface based on the received sensed data;

wherein the robot simulation model receives sensed data from the at least one sensor and outputs robot commands to the machine body based on the received sensed data;

wherein the robot simulation model receives user commands from the user interface and outputs robot user commands to the machine body based on the received user commands;

wherein the user simulation model receives robot simulation updates from the robot simulation model and transmits user simulation updates to the robot simulation model;

wherein the robot simulation model receives user simulation updates from the user simulation model and transmits robot simulation updates to the user simulation model, wherein the user simulation model receives the user commands from the user interface and outputs the virtual representation updates to the user interface based on the received user commands at a first rate and wherein the user simulation model receives the sensed data from the at least one sensor and outputs the robot virtual representation updates to the user interface based on the received sensed data at a second rate different from said first rate.

2. The system according to claim 1, wherein the robot simulation model receives the sensed data from the at least one sensor and outputs the robot commands to the machine body at a first rate and wherein the user robot simulation model receives the user commands from the user interface and outputs the robot user commands to the machine body based on the received user commands at a second rate different from said first rate.

3. The system according to claim 1, wherein the sensed data regarding the machine body is transmitted to the user simulation model at a first rate and the sensed data regarding the environment surrounding the robot machine is transmitted to the user simulation model at a second rate different from the first rate.

4. The system according to claim 1, wherein a difference between the robot simulation model and the body causes the at least one processor to maneuver the robot machine such that the difference between the robot simulation model and the body no longer exists.

5. The system according to claim 1, wherein the robot machine comprises a plurality of robot machines.

6. The system according to claim 1, wherein the robot processor is operable to maneuver the machine body in the environment surrounding the robot machine as a function of the sensed data from the at least one sensor, the robot simulation model, and the received user commands.

7. The system according to claim 1, wherein the robot processor is operable to maneuver the machine body in response to the sensed data from the at least one sensor crossing a safety threshold, and disregard the received user commands and the robot simulation model.

8. The system according to claim 1, wherein the robot processor is operable to maneuver the machine body in the environment surrounding the robot machine as a function of the robot simulation model.

9. The system according to claim 8, wherein the robot simulation model is based on the received user commands and the sensed data.

10. The system according to claim 1, wherein the user simulation updates are based on the received sensed data, the received user commands, and the user simulation model.

11. The system according to claim 1, wherein the robot simulation updates are based on the received sensed data, the received user commands and the user simulation updates.

12. An apparatus for teleoperation, the apparatus comprising at least one processor and a memory storing computer program instructions executable by the at least one processor, wherein the memory with the computer instructions and the processor are configured to cause the apparatus to at least:
  (a) maintain, by the memory, a simulation model;
  (b) sense, by at least one sensor, data corresponding to a body of the apparatus and an environment surrounding the apparatus;
  (c) transmit, by the at least one processor, the sensed data;
  (d) receive, by the at least one processor, a new simulation model, the new simulation model comprising a description of the body of the apparatus and the environment surrounding the apparatus;
  (e) determine, by the at least one processor, an updated simulation model, the updated simulation model comprising a combination of the new simulation model and the sensed data; and
  (f) moving the apparatus in response to the determined updated simulation model, wherein the sensed data is transmitted at a first rate and wherein the new simulation model is received at a second rate different from said first rate.

13. The apparatus according to claim 12, wherein the new simulation model is based on a user inputs at a user interface remote from the apparatus, the simulation model, and the sensed data.

14. The apparatus according to claim 12, wherein the moving is overridden in response to new sensed data corresponding to at least one of (i) the body of the apparatus, and (ii) the environment surrounding the apparatus.

15. The apparatus according to claim 12, wherein the moving is based on a difference between the updated simulation model and the body causing the at least one processor to move the apparatus such that the difference between the updated simulation model and the body no longer exists.

16. The apparatus according to claim 15, wherein the at least one processor is operable to move the apparatus in response to the sensed data crossing a safety threshold, and disregard the determined updated simulation model.

17. An apparatus for teleoperation, the apparatus comprising at least one processor and a memory storing computer program instructions executable by the at least one processor, wherein the memory with the computer instructions and the processor are configured to cause the apparatus to at least:
  (a) maintain, by the memory, a simulation model;
  (b) transmit, by the at least one processor, the simulation model to a user interface and a robot machine;
  (c) receive, by the at least one processor, sensed data from the robot machine and user inputs from the user interface;
  (d) determine, by the at least one processor, an updated simulation model comprising a combination of the received sensed data, the received user inputs, and the simulation model; and
  (e) transmit, by the at least one processor, the updated simulation model to the robot machine and the user interface, wherein the sensed data is received at a first rate and wherein the user inputs are received at a second rate different from said first rate.

18. The apparatus according to claim 17, wherein the updated simulation model is a virtual representation of the robot machine and an environment surrounding the robot machine.

19. The apparatus according to claim 17, wherein the received user inputs comprise a user's interactions with a user simulation model.

20. An apparatus for teleoperation, the apparatus comprising a user interface, at least one processor and a memory storing computer program instructions executable by the at least one processor, wherein the memory with the computer instructions and the processor are configured to cause the apparatus to at least:
 (a) maintain, by the memory, a user simulation model;
 (b) display, by the user interface, the user simulation model as a virtual representation of a robot machine and an environment surrounding the robot machine, the virtual representation based on the simulation model;
 (c) receive, by the user interface, user inputs to the virtual representation;
 (d) change, by the at least one processor, the displayed virtual representation based on the received user inputs;
 (d) transmit, by the at least one processor, the user inputs; and
 (e) receive, by the at least one processor, an updated user simulation model; and
 (f) display, by the user interface, the updated user simulation model, wherein the virtual representation is changed at a first rate and wherein the updated user simulation model is received at a second rate different from said first rate.

21. The apparatus according to claim 20, wherein the received user inputs comprise a user's interactions with the user simulation model.

22. The apparatus according to claim 20, wherein the user interface comprises a display and a haptic interface, the display operable to display the virtual representation of the user simulation model and the updated user simulation model, the haptic interface operable to provide haptic feedback to the user based on the user simulation model and operable to receive user inputs.

23. The apparatus according to claim 20, wherein the user inputs are transmitted to a server and the robot machine.

* * * * *